(12) United States Patent
Romanov (10) Patent No.: US 10,914,192 B2
(45) Date of Patent: Feb. 9, 2021

(54) IMPINGEMENT COOLING FOR GAS TURBINE ENGINE COMPONENT

(71) Applicant: United Technologies Corporation, Farmington, CT (US)

(72) Inventor: Dmitriy A. Romanov, Wells, ME (US)

(73) Assignee: RAYTHEON TECHNOLOGIES CORPORATION, Waltham, MA (US)

( * ) Notice: Subject to any disclaimer, the term of this patent is extended or adjusted under 35 U.S.C. 154(b) by 113 days.

(21) Appl. No.: 16/141,228

(22) Filed: Sep. 25, 2018

(65) Prior Publication Data
US 2020/0095887 A1   Mar. 26, 2020

(51) Int. Cl.
F01D 25/12 (2006.01)
F01D 9/04 (2006.01)
F01D 11/08 (2006.01)

(52) U.S. Cl.
CPC .......... *F01D 25/12* (2013.01); *F01D 9/041* (2013.01); *F01D 11/08* (2013.01); *F05D 2220/323* (2013.01); *F05D 2240/11* (2013.01); *F05D 2240/12* (2013.01); *F05D 2260/201* (2013.01)

(58) Field of Classification Search
None
See application file for complete search history.

(56) References Cited

U.S. PATENT DOCUMENTS

| | | | | |
|---|---|---|---|---|
| 3,583,824 A | * | 6/1971 | Smuland | F01D 11/18 415/117 |
| 4,157,232 A | * | 6/1979 | Bobo | F01D 11/08 415/116 |
| 5,964,575 A | * | 10/1999 | Marey | F01D 25/12 415/115 |
| 6,126,389 A | | 10/2000 | Burdgick | |
| 6,146,091 A | | 11/2000 | Watanabe et al. | |
| 6,659,714 B1 | * | 12/2003 | Tiemann | F01D 5/188 415/115 |
| 6,779,597 B2 | | 8/2004 | DeMarche et al. | |
| 8,123,466 B2 | * | 2/2012 | Pietraszkiewicz | F01D 11/08 415/116 |
| 8,292,573 B2 | | 10/2012 | Broomer et al. | |
| 8,667,682 B2 | * | 3/2014 | Lee | B21K 3/00 29/890.01 |

(Continued)

FOREIGN PATENT DOCUMENTS

EP   3190265   7/2017

OTHER PUBLICATIONS

The Extended European Search Report for EP Application No. 19199546.3, dated Nov. 28, 2019.

*Primary Examiner* — Justin D Seabe
*Assistant Examiner* — Jason G Davis
(74) *Attorney, Agent, or Firm* — Carlson, Gaskey & Olds, P.C.

(57) ABSTRACT

An impingement plate for providing cooling to a gas turbine engine component includes a first surface with a second surface opposite the first surface. The first surface and the second surface are surrounded by a perimeter defining an edge. A first plurality of holes extend through the impingement plate. A plurality of protrusions extend outward from one of the first surface or the second surface and have a distal surface transverse to one of the first surface or the second surface. At least one second impingement hole extends through the distal surface.

19 Claims, 5 Drawing Sheets

(56) References Cited

U.S. PATENT DOCUMENTS

| | | | |
|---|---|---|---|
| 8,727,714 B2* | 5/2014 | Snider | F01D 9/023 |
| | | | 415/178 |
| 8,826,668 B2* | 9/2014 | Lee | F01D 9/023 |
| | | | 60/755 |
| 9,181,813 B2 | 11/2015 | Schilp | |
| 2005/0150632 A1 | 7/2005 | Mayer et al. | |
| 2017/0234139 A1 | 8/2017 | Bunker et al. | |
| 2017/0292407 A1* | 10/2017 | Moga | F01D 5/187 |

* cited by examiner

IMPINGEMENT COOLING FOR GAS TURBINE ENGINE COMPONENT

BACKGROUND

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which do not rotate, guide the airflow and prepare it for the next set of turbine blades. In order to allow the gas turbine engine to operate at higher temperatures and be more efficient, there is a need to provide improved cooling to high temperature areas of the gas turbine engine.

SUMMARY

In one exemplary embodiment, an impingement plate for providing cooling to a gas turbine engine component includes a first surface with a second surface opposite the first surface. The first surface and the second surface are surrounded by a perimeter defining an edge. A first plurality of holes extend through the impingement plate. A plurality of protrusions extend outward from one of the first surface or the second surface and have a distal surface transverse to one of the first surface or the second surface. At least one second impingement hole extends through the distal surface.

In a further embodiment of the above, the first plurality of holes extend along a first longitudinal axis. At least one second impingement hole extends along a second longitudinal axis transverse to the first longitudinal axis.

In a further embodiment of any of the above, the first longitudinal axis is perpendicular to the first surface and the second surface.

In a further embodiment of any of the above, the second longitudinal axis extends towards the edge.

In a further embodiment of any of the above, the plurality of protrusions extend outward from the first surface.

In a further embodiment of any of the above, the plurality of protrusions extend outward from the second surface.

In a further embodiment of any of the above, the first surface extends in a first plane and the second surface extends in a second plane spaced from the first plane.

In another exemplary embodiment, an impingement assembly includes a component at least partially defining an impingement cavity. An impingement plate provides cooling to a gas turbine engine component and at least partially encloses the impingement cavity. The impingement plate includes a first surface. A second surface is opposite the first surface. The first surface and the second surface are surrounded by a perimeter that defines an edge. A first plurality of holes extend through the impingement plate. A plurality of protrusions extend outward from one of the first surface or the second surface and has a distal surface transverse to one of the first surface or the second surface. At least one second impingement hole extends through the distal surface.

In a further embodiment of any of the above, the first plurality of holes extend along a first longitudinal axis. At least one second impingement hole extends along a second longitudinal axis transverse to the first longitudinal axis.

In a further embodiment of any of the above, the first longitudinal axis is perpendicular to the first surface and the second surface.

In a further embodiment of any of the above, the plurality of protrusions extend outward from one of the first surface or the second surface.

In a further embodiment of any of the above, one of the first surface or the second surface surrounds each of the plurality of protrusions.

In a further embodiment of any of the above, the first surface extends in a first plane. The second surface extends in a second plane spaced from the first plane.

In a further embodiment of any of the above, the component is a blade outer air seal and the first surface includes a blade outer air seal contact surface in direct contact with the blade outer air seal.

In a further embodiment of any of the above, the second longitudinal axis extends towards a blade arrival edge of a blade outer air seal.

In a further embodiment of any of the above, the component is a vane. The first surface includes a vane contact surface in direct contact with the vane.

In another exemplary embodiment, a method of cooling a component in a gas turbine engine includes directing a first portion of cooling airflow through a first plurality of holes in an impingement plate into an impingement cavity. The impingement plate includes a first surface opposite a second surface. The first surface and the second surface are surrounded by a perimeter that defines an edge. A second portion of cooling airflow is directed through a second plurality of holes in the impingement plate. A direction of flow of the first portion of cooling airflow is transverse to a direction of flow of the second portion of cooling airflow.

In a further embodiment of any of the above, the component is one of a blade outer air seal or a vane.

In a further embodiment of any of the above, directing the second portion of cooling airflow includes directing the second portion of cooling airflow towards a blade arrival edge of the blade outer air seal.

DETAILED DESCRIPTION

Figure 1:
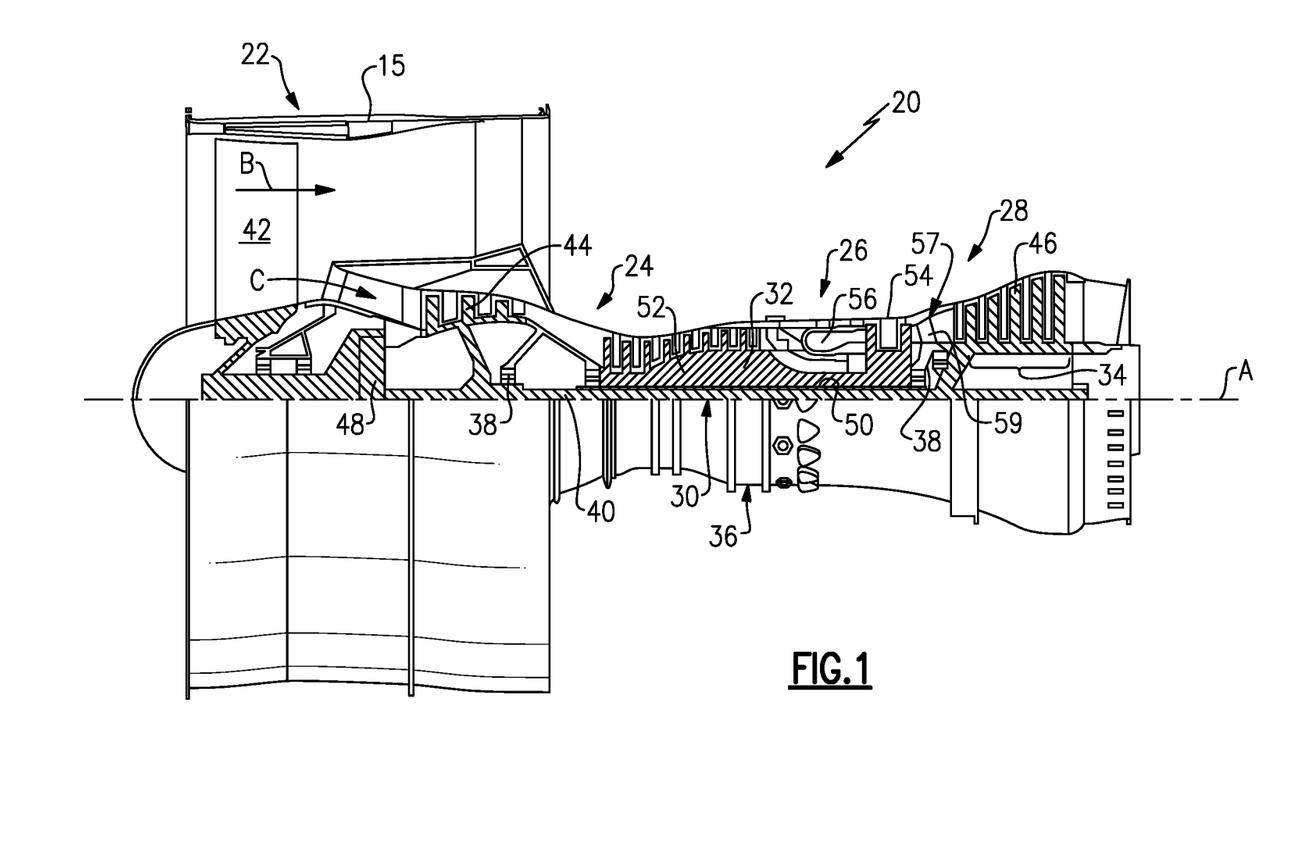
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
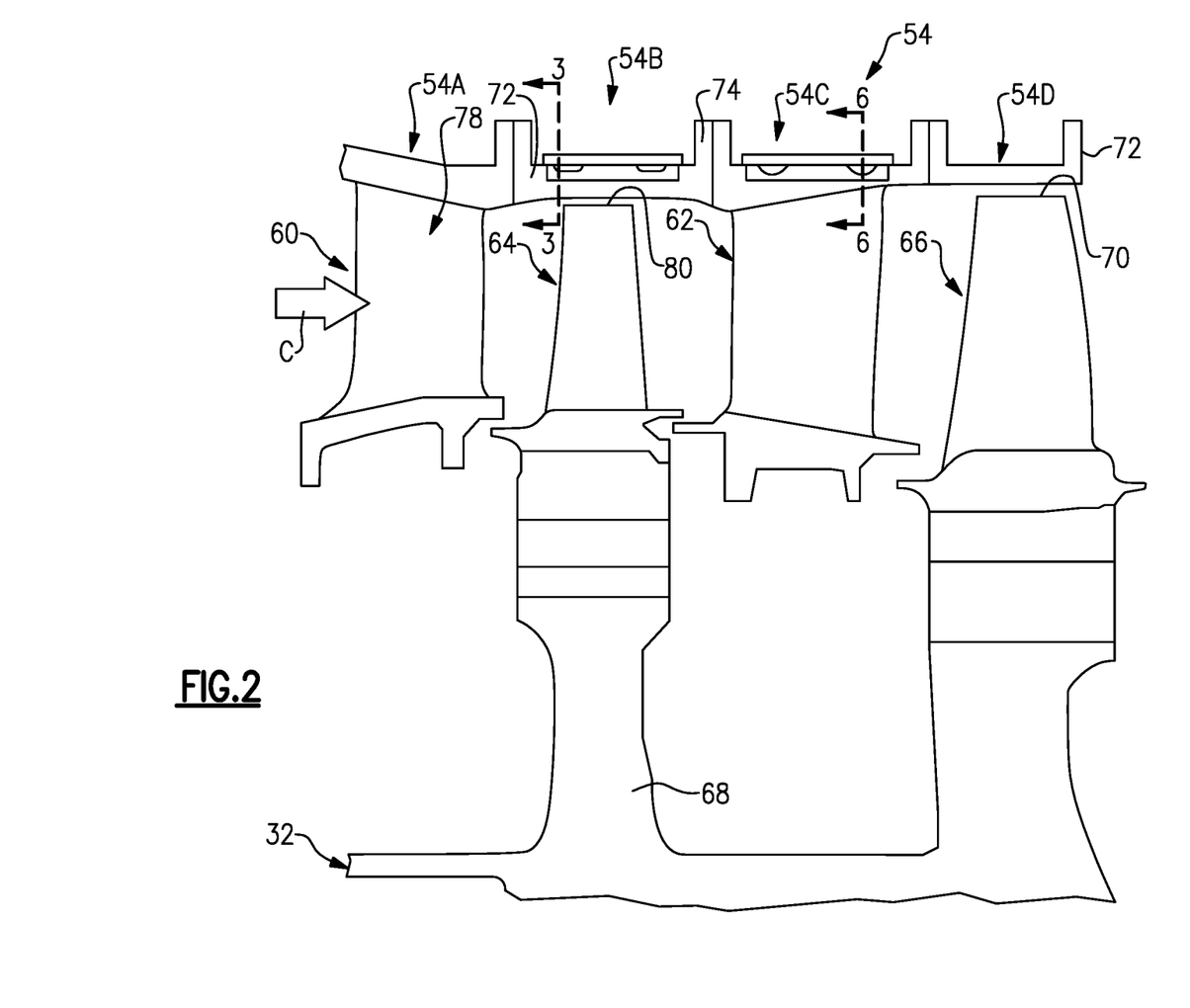
FIG. 2 is a schematic view of an example turbine section in the gas turbine engine of FIG. 1.

FIG. 2 illustrates a cross-sectional view of a portion of the high pressure turbine section 54. However, the low pressure turbine 46 or the compressor section 24 could benefit from this disclosure. The high pressure turbine section 54 includes first and second arrays 54A, 54C of circumferentially spaced fixed vanes 60, 62. The arrays 54A, 54C are axially spaced apart from one another. A first array 54B of circumferentially spaced turbine blades 64, mounted to a rotor disk 68, is arranged axially between the first and second fixed vane arrays 54A, 54C. A second array 54D of circumferentially spaced turbine blades 66 is arranged aft of the second array 54C of fixed vanes 62.

The turbine blades 64, 66 each include a free tip end 70 adjacent to a blade outer air seal 72. The first and second arrays 54A, 54C of turbine vanes and first and second arrays 54B, 54D of turbine blades are arranged within the core flow path C and the first and second arrays 54B, 54D are operatively connected to the high speed spool 32.

Figure 3:
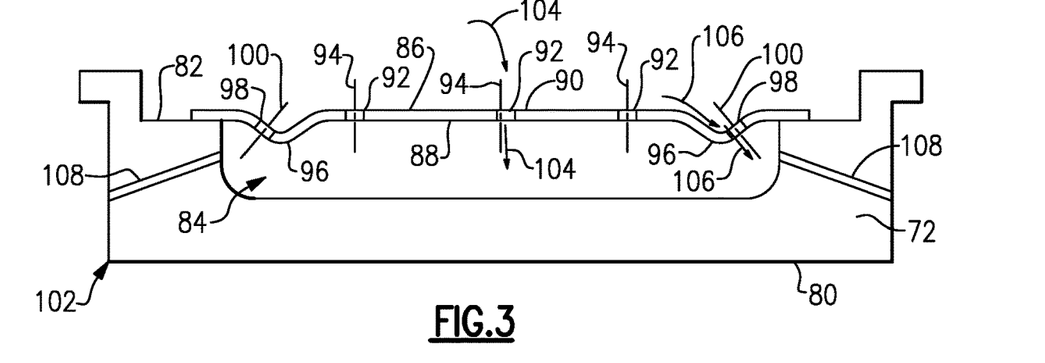
FIG. 3 is a cross-sectional view of an example blade outer air seal and impingement plate taken along line 3-3 of FIG. 2.

FIG. 3 illustrates a cross-sectional view of the blade outer air seal 72 taken along line 3-3 of FIG. 2. A radially inner side of the blade outer air seal 72 includes a gas path surface 80 and a radially outer side of the blade outer air seal 72 includes an outer surface 82 forming a perimeter of an impingement cavity 84. The impingement cavity 84 is at least partially enclosed by an impingement plate 86 engaging the outer surface 82 of the blade outer air seal.

The impingement plate 86 includes a first surface 88 on a radially inner side and a second surface 90 on a radially outer side opposite the first surface 88. The first surface 88 extends in a first plane and the second surface 90 extends in a second plane spaced from the first plane. A first plurality of impingement cooling holes 92 extend through the impingement plate 86 including the first surface 88 and the second surface 90. The first plurality of impingement cooling holes 92 also extend along a first longitudinal axis 94 that is perpendicular to the first surface 88 and the second surface 90 and can have the same diameter or varying diameters.

Figure 4:
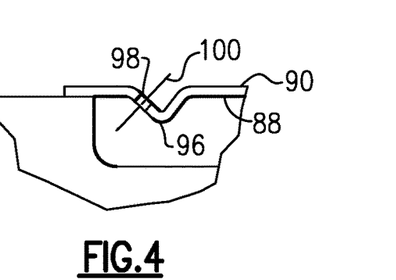
FIG. 4 is an enlarged view of an example protrusion on the impingement plate of FIG. 3.
Figure 5:
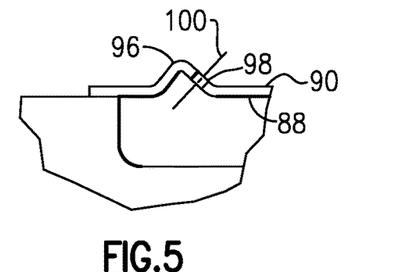
FIG. 5 is an enlarged view illustrating another example protrusion.

The impingement plate 86 also includes a plurality of protrusions 96 that either extend from the first surface 88 as shown in FIGS. 3 and 4 or the second surface 90 as shown in FIG. 5. The plurality of protrusions 96 include at least one of a second plurality of impingement cooling holes 98. The second plurality of impingement cooling holes 98 extend along a second longitudinal axis 100 that is transverse to the first longitudinal axis 94 and can have the same diameter or varying diameters. The second plurality of impingement holes 98 are able to improve cooling of portions the blade outer air seal 72 that are subject to elevated temperatures, such as an arrival edge 102 of blade outer air seal 72. The arrival edge 102 on the blade outer air seal 72 corresponds to the location of arrival of one of the turbine blades 64, 66 at the blade outer air seal 72 as the turbine blades 64, 66 rotate.

During cooling of the blade outer air seal 72, a first portion 104 of bleed air from the compressor section 24 is directed into the first plurality of impingement cooling holes 92 and a second portion 106 of the bleed air from the compressor section 24 is directed to the second plurality of impingement cooling holes 98. The first portion 104 of bleed air impinges on a base portion of the impingement cavity 84. The second portion 106 of bleed air enters the impingement cavity 84 transverse to the base portion 104, 106 and toward walls portions the impingement cavity 84. The bleed air entering the impingement cavity 84 then passes through bleed holes 108 in the blade outer air seal 72.

Figure 6:
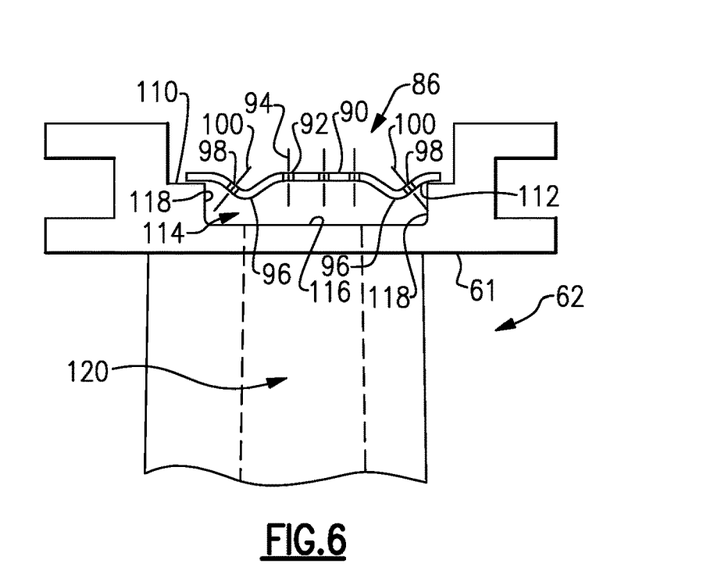
FIG. 6 is a cross-sectional view of an example vane taken along line 6-6 of FIG. 2.

As shown in FIG. 6, the impingement plate 86 can also be positioned relative to the vane 62. A radially outer side of a radially outer platform 61 includes an outer surface 110 forming a perimeter 112 of an impingement cavity 114. The impingement cavity 114 is at partially enclosed by the impingement plate 86. The first plurality of impingement cooling holes 92 are directed toward a base portion 116 of the impingement cavity 114 and the second plurality of impingement cooling holes 98 are directed toward circumferential edges 118 of the impingement cavity 114. The first and second plurality of impingement cooling holes 92, 98 also feed cooling air into a central passage 120 that extends radially through the vane 62.

Figure 7:
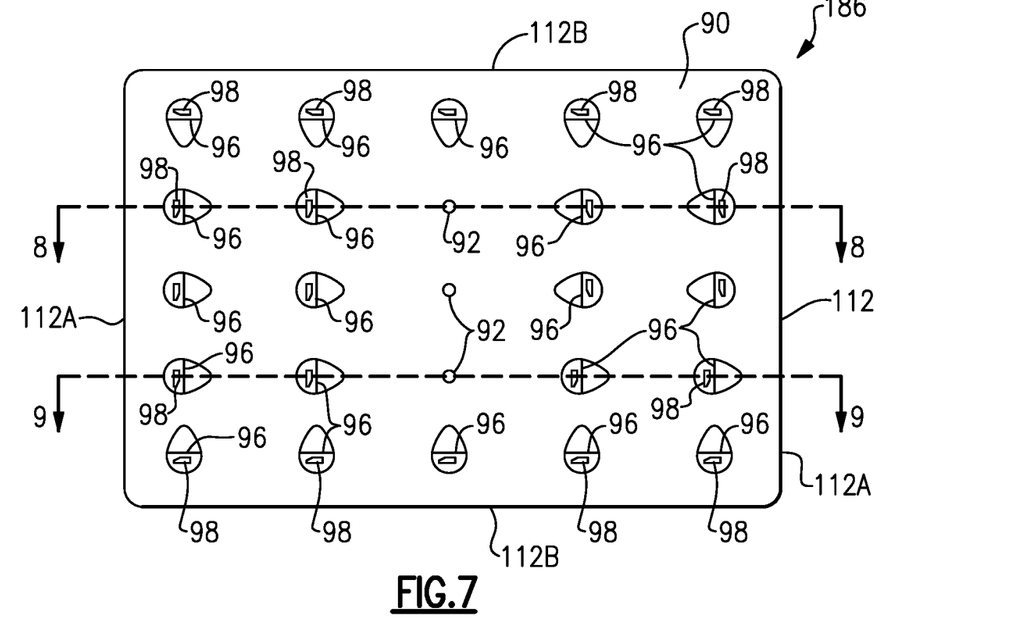
FIG. 7 is a top view of another example impingement plate.

FIG. 7 illustrates a top view of another example impingement plate 186. In the illustrated example, the impingement plate 186 is defined by an outer edge forming the perimeter 112 of the impingement plate 186. The first and second plurality of impingement cooling holes 92 and 98 are defined in a 5×5 pattern with the first plurality of impingement cooling holes 92 spaced inward from the perimeter 112 by the second plurality of impingement cooling holes 98. However, other numbers of rows and columns could be used or the rows and/or columns could be staggered. Alternatively, the rows and columns could form another pattern or could be unequally spaced relative to each other. In the illustrated example, the second plurality of impingement cooling holes 98 can point towards either circumferential edge 112A or axial edge 112B.

Figure 8:
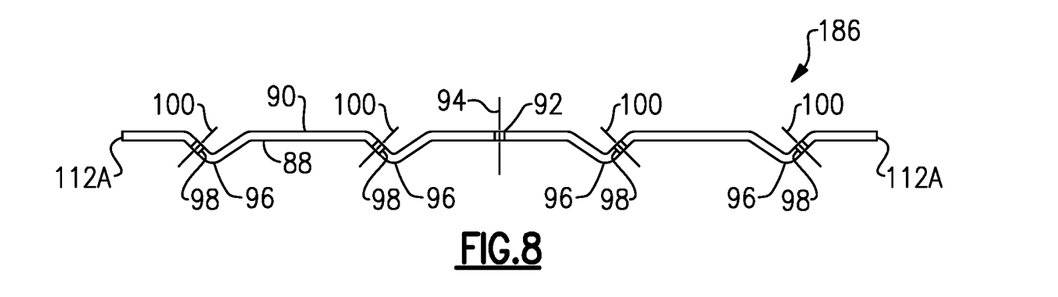
FIG. 8 is a cross-sectional view taken along line 8-8 of FIG. 7.

As shown in the cross-sectional view of FIG. 8 taken along line 8-8 of FIG. 7, the row of the first and second plurality of impingement cooling holes 92 and 98 include a pair of the second plurality of impingement cooling holes 98 directed towards one of the circumferential edges 112A and another pair of the second plurality of cooling holes directed towards the other of the circumferential edges 112A. Each of the pairs of the second plurality of impingement cooling holes 98 are spaced from each other by one of the first plurality of impingement cooling holes 92.

Figure 9:
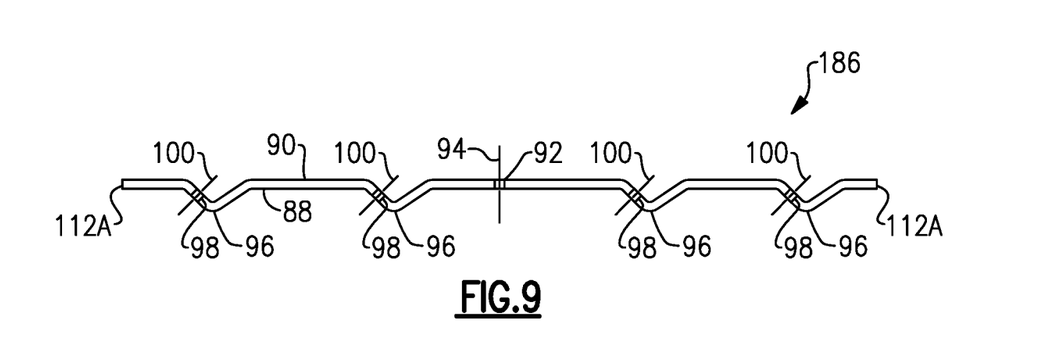
FIG. 9 is a cross-sectional view taken along line 9-9 of FIG. 7.

As shown in the cross-sectional view of FIG. 9 taken along line 9-9 of FIG. 7, the row of the first and second plurality of impingement cooling holes 92 and 98 include a pair of the second plurality of impingement cooling holes 98 directed towards one of the circumferential edges 112A and another pair of the second plurality of impingement cooling holes 98 directed towards the same circumferential edges 112A. Each of the pairs of the second plurality of impingement cooling holes 98 are spaced from each other by one of the first plurality of impingement cooling holes 92.

Figure 10:
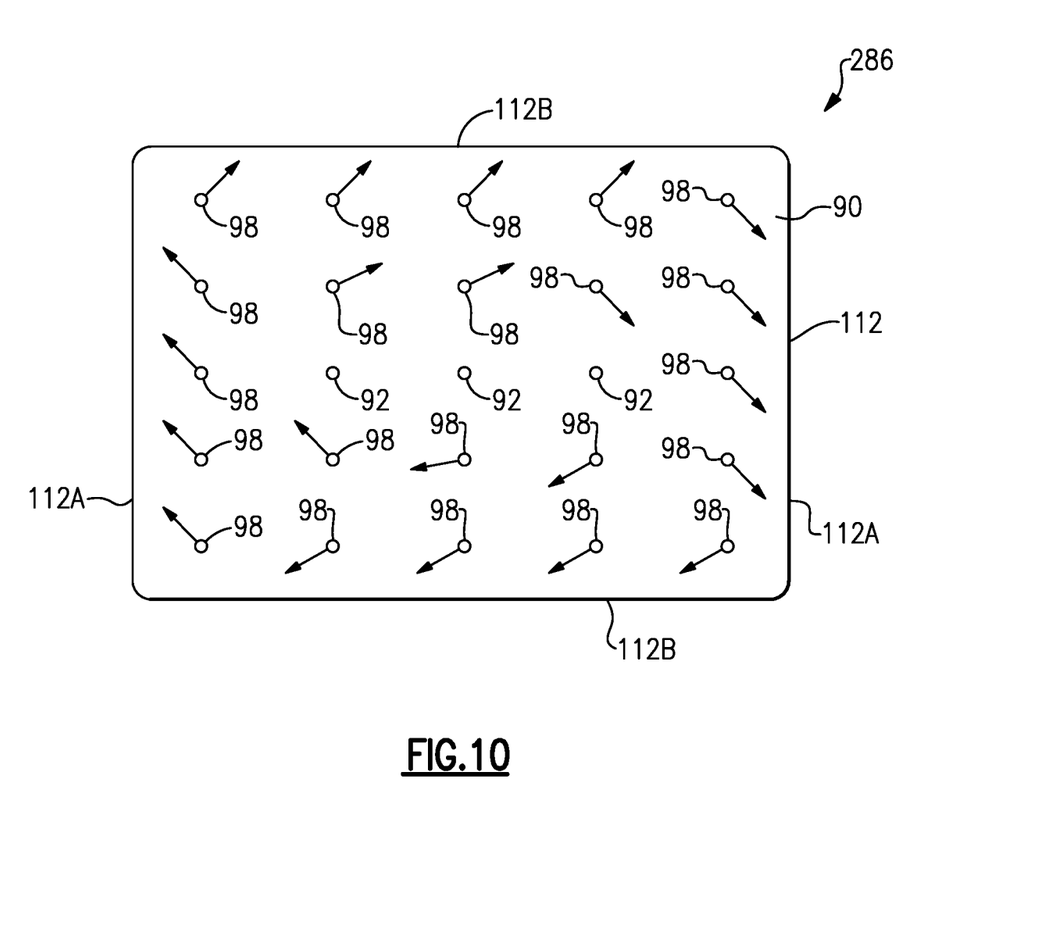
FIG. 10 is a schematic top view of yet another example impingement plate illustrating an example flow pattern.

FIG. 10 schematically illustrates an example flow pattern for the first and second plurality of impingement cooling holes 92, 98 on yet another example impingement plate 286. In the illustrated example, the second plurality of impingement cooling holes 98 direct the cooling fluid in a circular direction.

In particular, the second plurality of impingement cooling holes 98 along a first one of the circumferential edges 112A are directed upstream and towards the first one of the circumferential edges 112A and the second plurality of cooling holes 98 along a upstream one of the axial edges 112B are directed towards the upstream one of the axial edges 112B and a second one of the circumferential second edges 112A. Furthermore, the second plurality of cooling holes 98 along the second one of the circumferential edges 112A are directed downstream and towards the second one of the circumferential edge 112A and the second plurality of impingement cooling holes 98 along a downstream one of the axial edges 112B are directed downstream and towards the first one of the circumferential edges 112A.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An impingement plate for providing cooling to a gas turbine engine component comprising:
   a first surface;
   a second surface opposite the first surface, wherein the first surface and the second surface are surrounded by a perimeter defining an edge;
   a first plurality of holes extending through the impingement plate from the first surface to the second surface;
   a plurality of protrusions extending outward from one of the first surface or the second surface and having a protrusion surface transverse to one of the first surface or the second surface; and
   at least one second impingement hole extending through the protrusion surface, wherein the at least one second impingement hole includes only a single second impingement hole in each of the plurality of protrusions and the plurality of protrusions include a first set of protrusions each having the single second impingement hole with a direction having a component towards a first lateral edge of the impingement plate, a second set of protrusions each having the single second impingement hole with a direction having a component towards a second lateral edge of the impingement plate, a third set of protrusions each having the single second impingement hole with a direction having a component towards a leading edge of the impingement plate, and a fourth set of protrusions each having the single second impingement hole with a direction having a component towards a trailing edge of the impingement plate.

2. The impingement plate of claim 1, wherein the first plurality of holes extend along a first longitudinal axis and the at least one second impingement hole extends along a second longitudinal axis transverse and non-perpendicular to the first longitudinal axis.

3. The impingement plate of claim 2, wherein the first longitudinal axis is perpendicular to the first surface and the second surface.

4. The impingement plate of claim 2, wherein the second longitudinal axis extends towards the edge.

5. The impingement plate of claim 1, wherein the plurality of protrusions extend outward from the first surface.

6. The impingement plate of claim 1, wherein the plurality of protrusions extend outward from the second surface.

7. The impingement plate of claim 1, wherein the first surface extends in a first plane and the second surface extends in a second plane spaced from the first plane with the first plurality of holes extending from the first plane to the second plane.

8. An impingement assembly comprising:
a component of a gas turbine engine at least partially defining an impingement cavity;
an impingement plate for providing cooling to the component and at least partially enclosing the impingement cavity, wherein the impingement plate includes:
a first surface;
a second surface opposite the first surface, wherein the first surface and the second surface are surrounded by a perimeter defining an edge;
a first plurality of holes extending through the impingement plate from the first surface to the second surface;
a plurality of protrusions extending outward from one of the first surface or the second surface and having a protrusion surface transverse to one of the first surface or the second surface; and
at least one second impingement hole extending through the protrusion surface, wherein the at least one second impingement hole includes only a single second impingement hole in each of the plurality of protrusions and the plurality of protrusions include a first set of protrusions each having the single second impingement hole with a direction having a component towards a first lateral edge of the impingement plate, a second set of protrusions each having the single second impingement hole with a direction having a component towards a second lateral edge of the impingement plate, a third set of protrusions each having the single second impingement hole with a direction having a component towards a leading edge of the impingement plate, and a fourth set of protrusions each having the single second impingement hole with a direction having a component towards a trailing edge of the impingement plate.

9. The assembly of claim 8, wherein the first plurality of holes extend along a first longitudinal axis and the at least one second impingement hole extends along a second longitudinal axis transverse and non-perpendicular to the first longitudinal axis.

10. The assembly of claim 9, wherein the first longitudinal axis is perpendicular to the first surface and the second surface.

11. The assembly of claim 10, wherein the plurality of protrusions extend outward from one of the first surface or the second surface.

12. The assembly of claim 10, wherein one of the first surface or the second surface surrounds each of the plurality of protrusions.

13. The assembly of claim 9, wherein the first surface extends in a first plane and the second surface extends in a second plane spaced from the first plane.

14. The assembly of claim 9, wherein the component is a blade outer air seal and the first surface includes a blade outer air seal contact surface in direct contact with the blade outer air seal.

15. The assembly of claim 9, wherein the second longitudinal axis extends towards a blade arrival edge of a blade outer air seal.

16. The assembly of claim 9, wherein the component is a vane and the first surface includes a vane contact surface in direct contact with the vane.

17. A method of cooling a component in a gas turbine engine comprising:
directing a first portion of cooling airflow through a first plurality of holes in an impingement plate into an impingement cavity, wherein the impingement plate includes a first surface opposite a second surface and the first surface and the second surface are surrounded by a perimeter defining an edge; and
directing a second portion of cooling airflow through a second plurality of holes located in a corresponding one of a plurality of protrusions in the impingement plate, wherein a direction of flow of the first portion of cooling airflow is transverse to a direction of flow of the second portion of cooling airflow and the first plurality of holes are spaced from the plurality of protrusions, wherein the second plurality holes includes only a single second hole in each of the plurality of protrusions and the plurality of protrusions include a first set of protrusions each having the single second hole with a direction having a component towards a first lateral edge of the impingement plate, a second set of protrusions each having the single second hole with a direction having a component towards a second lateral edge of the impingement plate, a third set of protrusions each having the single second hole with a direction having a component towards a leading edge of the impingement plate, and a fourth set of protrusions each having the single second impingement hole with a direction having a component towards a trailing edge of the impingement plate.

18. The method of claim 17, wherein the component is one of a blade outer air seal or a vane.

19. The method of claim 18, wherein directing the second portion of cooling airflow includes directing the second portion of cooling airflow towards a blade arrival edge of the blade outer air seal.

* * * * *